United States Patent
Lee et al.

(10) Patent No.: US 8,467,813 B2
(45) Date of Patent: Jun. 18, 2013

(54) METHOD FOR MONITORING A PAGING MESSAGE WITHOUT PAGING LOST AND COMMUNICATION APPARATUSES UTILIZING THE SAME

(71) Applicant: MediaTek Inc., Hsin-Chu (TW)

(72) Inventors: Chi-Chen Lee, Taipei (TW); Yi-Chun Wei, Hsinchu (TW); Meng-Shiang Lin, New Taipei (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 13/662,864

(22) Filed: Oct. 29, 2012

(65) Prior Publication Data

US 2013/0109391 A1 May 2, 2013

Related U.S. Application Data

(60) Provisional application No. 61/554,150, filed on Nov. 1, 2011.

(51) Int. Cl.
*H04Q 7/20* (2006.01)

(52) U.S. Cl.
USPC .......................................... 455/458; 370/311

(58) Field of Classification Search
USPC ............ 455/458, 436, 426.1, 435.1; 370/311, 370/329; 709/222
See application file for complete search history.

(56) References Cited

U.S. PATENT DOCUMENTS

2011/0072121 A1* 3/2011 Takasugi et al. .............. 709/222
2011/0188426 A1* 8/2011 Song et al. .................... 370/311

* cited by examiner

*Primary Examiner* — Phuoc Doan
(74) *Attorney, Agent, or Firm* — McClure, Qualey & Rodack, LLP (57) ABSTRACT

A communication apparatus is provided. A processor is coupled to a transceiver and includes at least a first processor logic unit for initiating a cell selection or a cell reselection procedure to camp on a target cell and obtain a plurality of paging parameters carried in one or more system information messages transmitted by the target cell via the transceiver and a second processor logic unit for monitoring a paging identifier on a downlink control channel via the transceiver to check whether there is any forthcoming paging message before the paging parameters are obtained from the target cell.

16 Claims, 9 Drawing Sheets

METHOD FOR MONITORING A PAGING MESSAGE WITHOUT PAGING LOST AND COMMUNICATION APPARATUSES UTILIZING THE SAME

CROSS REFERENCE TO RELATED APPLICATIONS

This application claims the benefit of U.S. Provisional Application No. 61/554,150 filed 2011, Nov. 1 and entitled "Method and Apparatus to Monitor Paging Message". The entire contents of which are hereby incorporated by reference.

BACKGROUND OF THE INVENTION

1. Field of the Invention

The invention relates to methods and apparatuses to monitor paging message, and more particularly to methods and apparatuses to monitor paging message during cell selection/reselection without paging lost.

2. Description of the Related Art

Due to mobile communication technology advancements in recent years, various communications services, such as voice call services, data transfer services, and video call services, etc., may be provided to users regardless of their locations. Most mobile communications systems are multiple access systems in which access and wireless network resources are allocated to multiple users. The multiple access technologies employed by the mobile communications systems include the 1x Code Division Multiple Access 2000 (1x CDMA 2000) technology, the 1x Evolution-Data Optimized (1x EVDO) technology, the Orthogonal Frequency Division Multiplexing (OFDM) technology, and the Long Term Evolution (LTE) technology. Evolved from the LTE technology, the LTE Advanced technology is a major enhancement of the LTE standard. The LTE Advanced technology should be compatible with LTE equipment, and should share frequency bands with the LTE communications system. One of the important LTE Advanced technology benefits is its ability to take advantage of advanced topology networks, wherein optimized heterogeneous networks have a mix of macros with low power nodes such as picocells, femtocells and new relay nodes.

Generally, a User Equipment (UE) in the mobile communications system monitors a paging channel in both a Radio Resource Control (RRC)_connected state and an RRC idle state. The UE is in the RRC_connected state when an RRC connection has been established. If no RRC connection is established, the UE is in the RRC_idle state. In the RRC_idle mode, the UE monitors a paging channel to detect possible incoming calls (or called mobile terminated call, MT call), system information change, Earthquake and Tsunami Warning System (ETWS) notifications (for ETWS capable UEs) and Commercial Mobile Alert System (CMAS) notifications (for CMAS capable UEs). In the RRC_connected mode, the UE monitors a paging channel and/or system information block type 1 contents to detect system information changes, ETWS notifications (for ETWS capable UEs) and CMAS notifications (for CMAS capable UEs).

Figure 1:
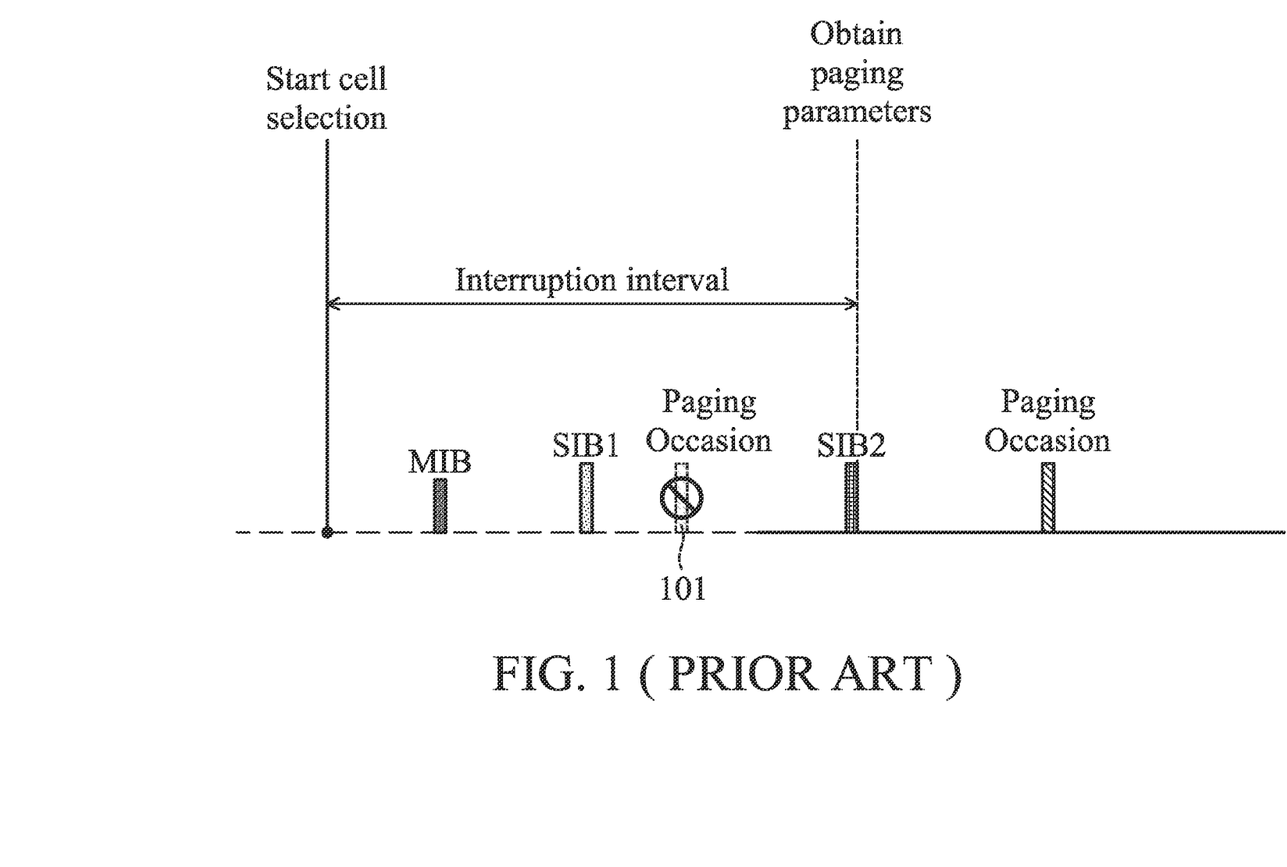
FIG. 1 shows a cell selection procedure.

Conventionally, during a cell selection or reselection procedure, the UE does not listen to or monitor the paging channel before all of the paging parameters required for deriving the occurrence time of the paging frames (PF) and paging occasions (PO) have been received from the network. Those paging parameters required for deriving the structure (i.e. the occurrence time) of the paging frames and paging occasions are respectively carried in the master information block (MIB) and the system information block type 2 (SIB2). The paging occasion (PO) defines the time for the communication apparatus to wake up (when required) and receive the paging indication messages, and the paging frame (PF) is a radio frame which may contain one or multiple paging occasions. FIG. 1 shows a cell selection procedure. There is an interruption interval after the beginning of the cell selection (that is, a suitable cell has been determined and a synchronization procedure between the UE and the suitable cell has begun) up to the time when the SIB2 has been received. During the interruption interval, the paging message and ETWS/CMAS notifications are unable to be received due to no paging parameters. Therefore, if any paging occasion occurs in the interruption interval, such as the paging occasion 101 shown in FIG. 1, the UE would miss the paging occasion and be unable to receive the paging messages transmitted at that paging occasion.

Figure 2:
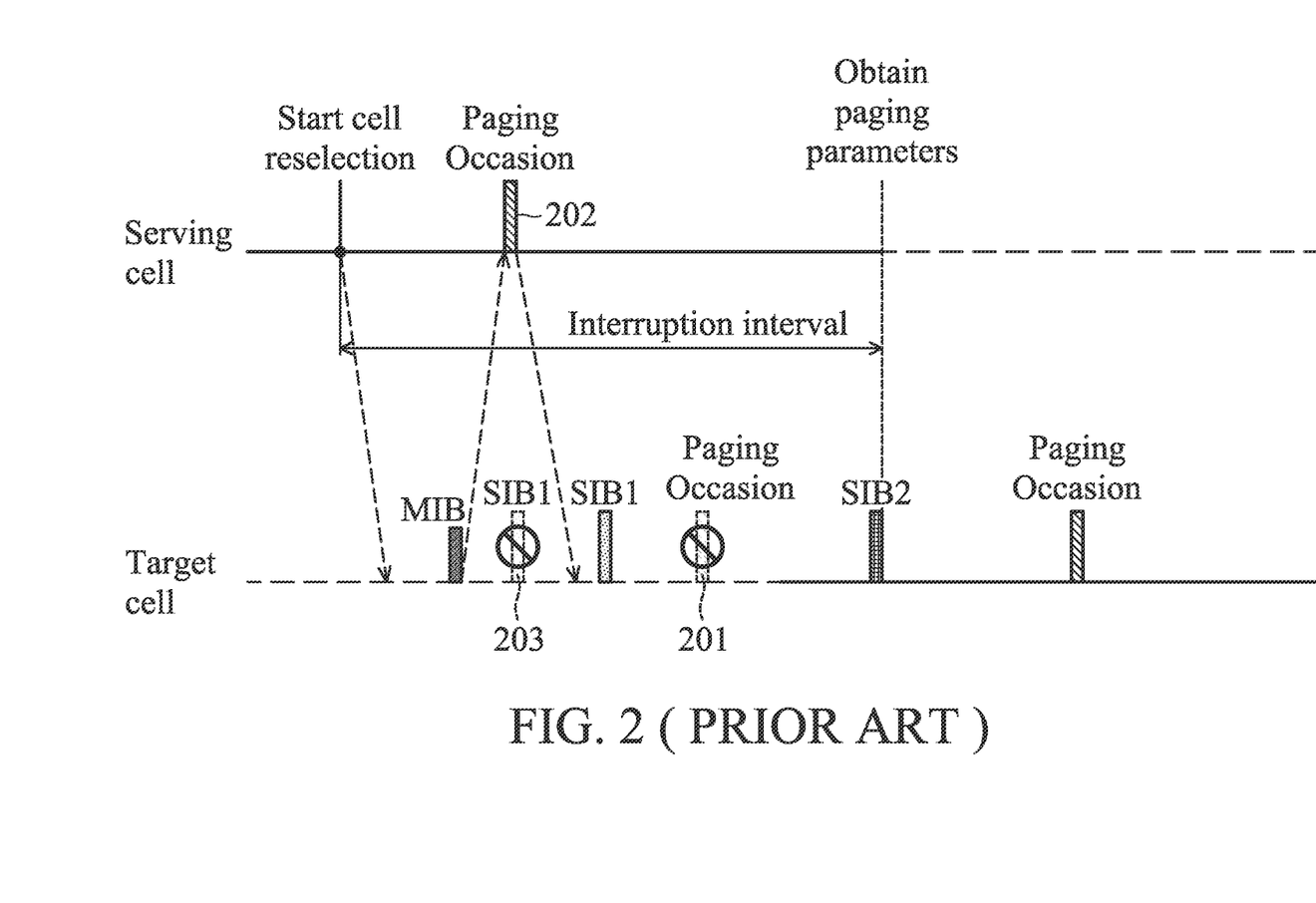
FIG. 2 shows a cell reselection procedure.

FIG. 2 shows a cell reselection procedure. In the cell reselection procedure, there is also an interruption interval, during which the paging message and ETWS/CMAS notifications are unable to be received from the target cell due to no paging parameters, after beginning of the cell reselection (that is, a target cell has been determined and a synchronization procedure between the UE and the target cell has begun) and until the SIB2 has been received from the target cell. If any paging occasion occurs in the interruption interval, such as the paging occasion 201 shown in FIG. 2, the UE would miss the paging occasion and be unable to receive the paging messages transmitted at that paging occasion. In addition, if the UE still wants to receive paging messages from the original serving cell, the UE may switch back to the monitoring of the paging channel corresponding to the original serving cell at the corresponding paging occasion, such as the paging occasion 202 shown in FIG. 2. However, one disadvantage of switching back to the monitoring of the original paging channel is that the paging message may be lost because the cell reselection is generally triggered when the signal quality of the original serving cell has deteriorated. Another disadvantage is that the interruption interval may be prolonged, due to the situation where the system information block type 1 (SIB1) 203 of the target cell colliding with the paging occasion 202 is missed.

Therefore, methods and apparatuses to monitor paging message during cell selection/reselection without paging lost are highly required.

BRIEF SUMMARY OF THE INVENTION

Communication apparatuses and methods for monitoring a paging message without paging lost are provided. An embodiment of a communication apparatus comprises a processor coupled to a transceiver. The processor comprises at least a first processor logic unit for initiating a cell selection or a cell reselection procedure to camp on a target cell and obtain a plurality of paging parameters carried in one or more system information messages transmitted by the target cell via the transceiver and a second processor logic unit for monitoring a paging identifier on a downlink control channel via the transceiver to check whether there is any forthcoming paging message before the paging parameters are obtained from the target cell.

An embodiment of a method for monitoring a paging message without paging lost comprises: initiating a cell selection or a cell reselection procedure to camp on a target cell and obtain a plurality of paging parameters carried in one or more system information messages transmitted by the target cell via a transceiver of a communications apparatus; and monitoring a paging identifier on a downlink control channel via the transceiver to check whether there is any forthcoming paging message before the paging parameters are obtained from the target cell.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
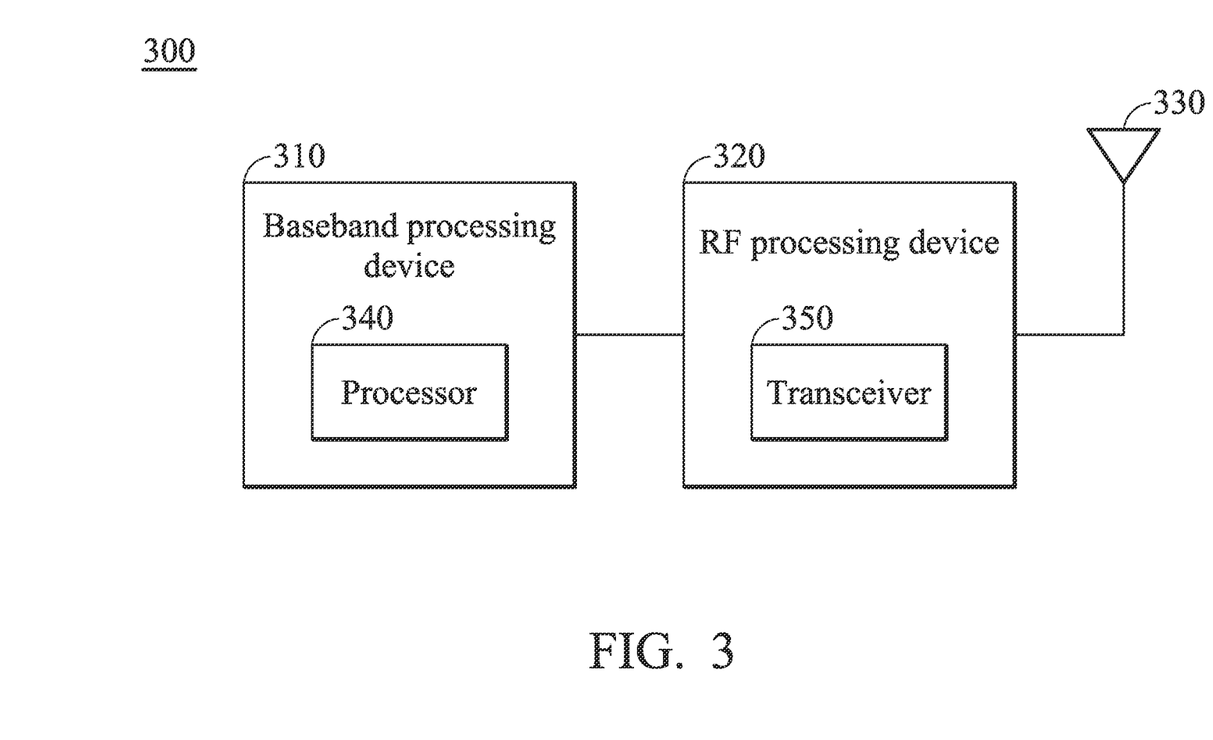
FIG. 3 is a simplified block diagram illustrating a communications apparatus according to an embodiment of the invention.

FIG. 3 is a simplified block diagram illustrating a communications apparatus according to an embodiment of the invention. The communications apparatus 300 may be a User Equipment (UE), such as a notebook, a cellular phone, a portable gaming device, a portable multimedia player, a Global Positioning System (GPS), a receiver, or others, in a mobile communications system. The mobile communications system may be a Global System for Mobile Communications (GSM), Universal Mobile Telecommunications System (UMTS), LTE, LTE Advanced, or any communications system developed based on other Radio Access Technology (RAT), or any combinations thereof. The communications apparatus 300 may comprise at least a baseband processing device 310, a radio frequency (RF) processing device 320 and at least an antenna 330. The baseband processing device 310 may comprise multiple hardware devices to perform baseband signal processing, including Analog to Digital Conversion (ADC)/Digital to Analog Conversion (DAC), gain adjusting, modulation/demodulation, encoding/decoding, and so on. For example, the baseband processing device 310 may comprise a processor 340 for performing baseband signal processing. The processor 340 may further control the operation of the baseband processing device 310 and RF processing device 320 and other functional components, such as a display unit and/or keypad serving as the MMI (man-machine interface), a storage unit storing data and program codes of applications or communication protocols, or others.

The RF processing device 320 may receive RF wireless signals, convert the received RF wireless signals to baseband signals, which are processed by the baseband processing device 310, or receive baseband signals from the baseband processing device 310 and convert the received baseband signals to RF wireless signals, which are later transmitted. The RF processing device 320 may also comprise multiple hardware devices to perform signal transceiving and radio frequency conversion. For example, the RF processing device 320 may comprise a transceiver 350 for transceiving RF wireless signals and a mixer (not shown) to multiply the baseband signals with a carrier oscillated in the radio frequency of the wireless communications system, wherein the radio frequency may be 900 MHz or 1800 MHz utilized in GSM systems, 900 MHz, 1900 MHz, or 2100 MHz utilized in UMTS systems, or may be 900 MHz, 2100 MHz, or 2.6 GHz utilized in the LTE systems, or others depending on the RAT in use. Note that in addition to the GSM system, UMTS system and the LTE system, it is to be understood that the invention may be applied to any future RAT.

According to an embodiment of the invention, the processor 340 may comprise a plurality of processor logic units, each, designed for handling one or more tasks or functionalities. For example, in one embodiment, the processor 340 may at least comprise a processor logic unit for initiating a cell selection or a cell reselection to camp on a target cell and obtain system information, including a plurality of paging parameters carried in one or more system information messages broadcasted by the target cell, via the transceiver 350. According to the embodiments of the invention, the cell selection or cell reselection may be triggered when the UE 300 performs (either manually or automatically) a Public Land Mobile Network (PLMN) selection procedure, an intra-LTE redirection procedure, an inter RAT redirection procedure, a reestablish procedure, a hand over procedure, or others. Unlike the conventional design, in which the UE does not listen to or monitor the paging channel before the SIB 2 has been received from the network due to the lack of paging parameters, based on the invention concept, the UE can begin to listen to or monitor the paging channel even before all of the paging parameters required for deriving the structure (i.e. the occurrence time) of the paging frames and paging occasions have been received from the network. Therefore, under the method and communications apparatus architecture developed based on the invention concept, there is no interruption interval where the UE cannot monitor the paging channel. Thus, the paging would not be lost anymore after the cell selection or cell reselection procedure has begun, even when the UE has not received the system information block type 2 (SIB2) message from the network. Several embodiments are further illustrated in the following paragraphs.

According to an embodiment of the invention, the processor 340 may further comprise a processor logic unit for monitoring a paging identifier on a downlink control channel during every possible paging occasions via the transceiver 350 during an extended monitoring interval to check whether there is any forthcoming paging message. The paging identifier may be a Paging-Radio Network Identifier (P-RNTI) and the downlink control channel may be the physical downlink control channel (PDCCH). The P-RNTI may be regarded as an indicator carried in the control region of the PDCCH to indicate whether there is any forthcoming paging message transmitted in the following data region. The P-RNTI is generally transmitted at the paging occasions. In addition, according to an embodiment of the invention, the extended monitoring interval may begin right after the cell selection or cell reselection procedure has begun, and the possible paging occasions may occur in the sub-frames that can be used to carry the paging identifier and/or the paging message.

Figure 4:
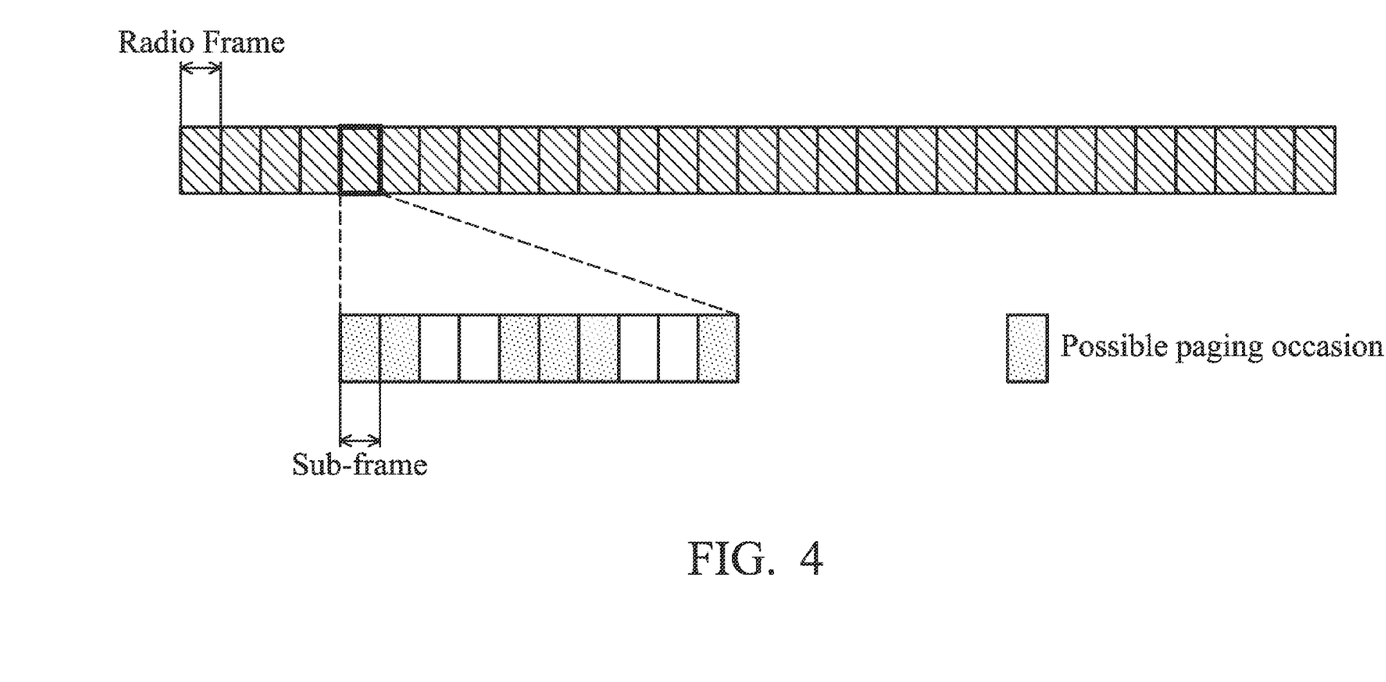
FIG. 4 is a radio frame structure showing the occurrence time of the possible paging occasions according to an embodiment of the invention.

FIG. 4 is a radio frame structure showing the occurrence time of the possible paging occasions according to an embodiment of the invention. In the LTE system, the paging occasions may only occur at the $0^{th}$, $1^{st}$, $5^{th}$ and $6^{th}$ sub frames (or the $1^{st}$, $2^{nd}$, $6^{th}$ and $7^{th}$ sub-frames when the sub-frame is numbered from 1 to 10) when the UE is configured by the network to operate under a time division duplex (TDD) mode (that is, the uplink and downlink data are transmitted in a TDD manner in the same frequency band), or may only occur at the $0^{th}$, $4^{th}$, $5^{th}$ and $9^{th}$ sub-frames (or the $1^{st}$, $5^{th}$, $6^{th}$ and $10^{th}$ sub-frames when the sub-frame is numbered from 1 to 10) when the UE is configured by the network to operate under a frequency division duplex (FDD) mode (that is, the uplink and downlink data are transmitted in different frequency bands in an FDD manner). Therefore, in the embodiments, the possible paging occasions to be monitored by the UE during the extended monitoring interval may be obtained according to an union of the $0^{th}$, $1^{st}$, $5^{th}$ and $6^{th}$ sub-frames (or the $1^{st}$, $2^{nd}$, $6^{th}$ and $7^{th}$ sub-frames) for TDD mode and the $0^{th}$, $4^{th}$, $5^{th}$ and $9^{th}$ sub-frames (or the $1^{st}$, $5^{th}$, $6^{th}$ and $10^{th}$ sub-frames) for FDD mode. In other words, as shown in FIG. 4, according to an embodiment of the invention, the possible paging occasions may occur in the $0^{th}$, $1^{st}$, $4^{th}$, $5^{th}$, $6^{th}$ and $9^{th}$ (or the $1^{st}$, $2^{nd}$, $5^{th}$, $6^{th}$, $7^{th}$ and $10^{th}$ when the sub-frame is numbered from 1 to 10) sub-frames in every radio frame.

Figure 5:
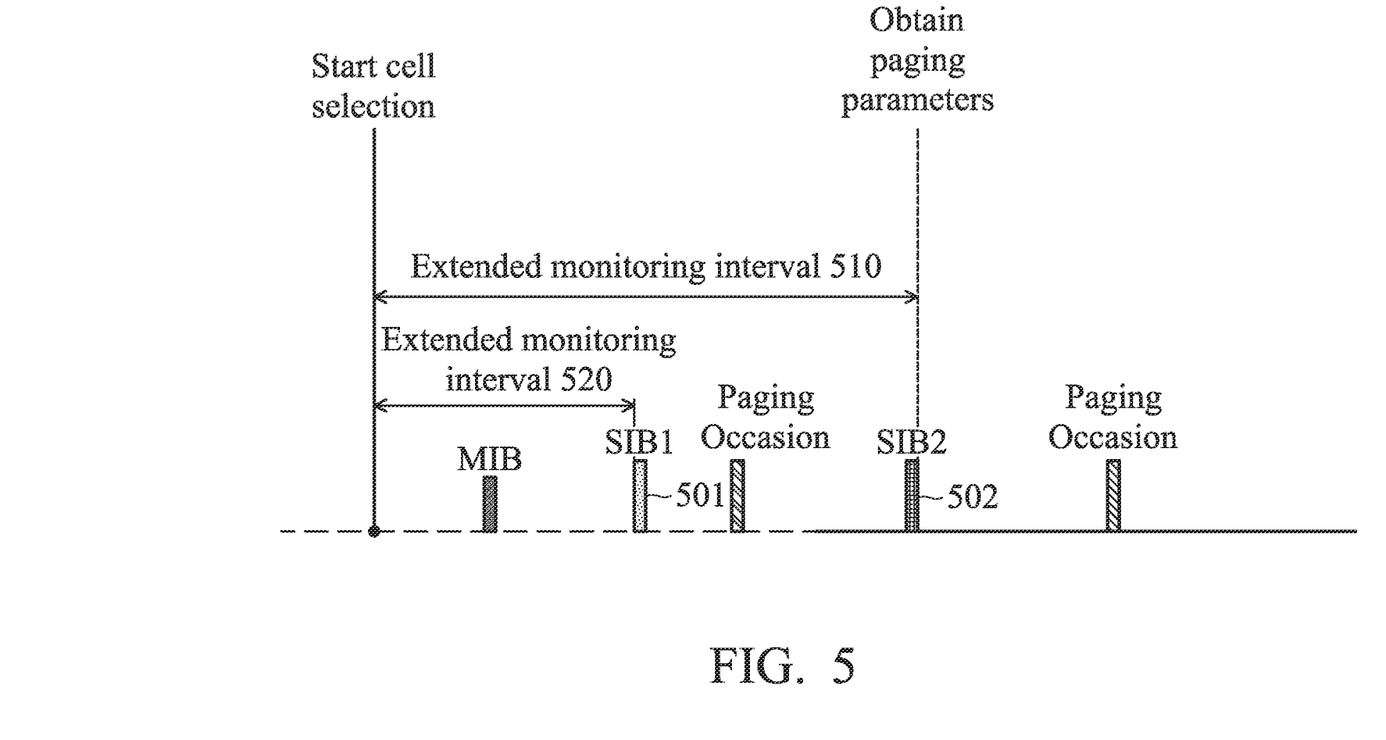
FIG. 5 shows a cell selection procedure with extended monitoring interval(s) according to an embodiment of the invention.
Figure 6:
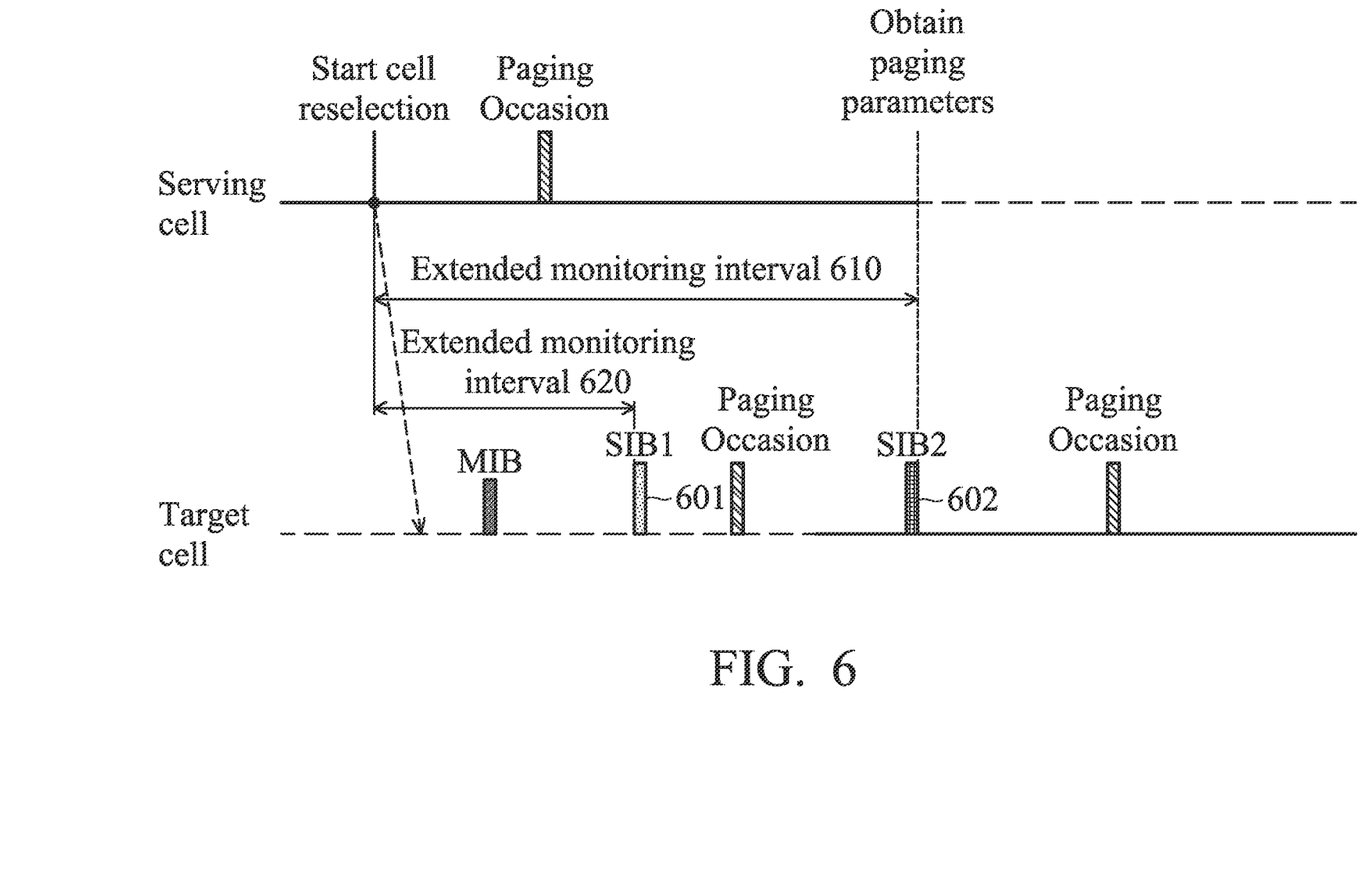
FIG. 6 shows a cell reselection procedure with extended monitoring interval(s) according to another embodiment of the invention.

FIG. 5 shows a cell selection procedure with extended monitoring interval(s) according to an embodiment of the invention. As shown in FIG. 5, the UE may monitor the P-RNTI on the PDCCH during every possible paging occasion during the extended monitoring interval 510 or 520. FIG. 6 shows a cell reselection procedure with extended monitoring interval(s) according to another embodiment of the invention. As shown in FIG. 6, the UE may monitor the P-RNTI on the PDCCH during every possible paging occasion during the extended monitoring interval 610 or 620. Note that the difference between the extended monitoring intervals 510 and 520 and between the extended monitoring intervals 610 and 620 is that the extended monitoring intervals 510 and 610 may be ended when the system information block type 2 (SIB 2) message is received from the target cell, while the extended monitoring intervals 520 and 620 may be ended earlier when the system information block type 1 (SIB 1) message is received from the target cell.

According to an embodiment of the invention, the processor 340 may further comprise one or more processor logic units for receiving the system information messages broadcasted by the target network. The system information messages may at least comprise the master information block (MIB) message, the system information block type 1 (SIB 1) message, the system information block type 2 (SIB 2) message, or the likes. In LTE, the MIB is the most important information block and it may contain downlink system bandwidth information, an antenna number, and a Physical Hybrid ARQ Indicator Channel (PHICH) configuration and System Frame Number (SFN). The SIB 1 message may contain cell access related information (for example, the PLMN identity list, tracking area code and cell identity), information for cell selection (for example, minimum required Rx level in the cell and offset), a frequency band indicator, scheduling information, a TDD configuration, a system information window length and system information value tag. The SIB 2 message may contain radio resource configuration information common for all UEs. More specially, the SIB 2 may include access barring information, a radio resource configuration of common channels (Random Access Channel (RACH) configuration, Broadcast Control Channel (BCCH) configuration, Paging Control Channel (PCCH) configuration, Physical Random Access Channel (PRACH) configuration, Physical Downlink Shared Channel (PDSCH) configuration, Physical Uplink Shared Channel (PUSCH) configuration and Physical Uplink Control Channel (PUCCH) configuration, sounding reference signal configuration, uplink (UL) power control information), timers and constants, which are used by UEs, an MBSFN sub-frame configuration, a time alignment timer and frequency information (UL EARFCN, UL bandwidth and additional spectrum emission).

Unlike the GSM or UMTS system, in the LTE system, as long as some basic system information, such as the downlink bandwidth, antenna number and PHICH configuration, are obtained, the UE may start monitoring paging messages of the LTE cell. In other words, the UE may start monitoring the paging identifier P-RNTI before knowing the PCCH configuration. In addition, because the paging identifier P-RNTI can be monitored by all UEs under the coverage of the LTE cell, the UE is allowed to receive all paging message, even when the paging message is not directed to the UE. Therefore, in the embodiments of the invention, the UE may monitor the P-RNTI on the PDCCH during every possible paging occasion during the extended monitoring interval, such as the extended monitoring intervals shown in FIG. 5 and FIG. 6, before the SIB 2 message is received.

In addition, according to another embodiment of the invention, the UE may further store cell-level information and the value tag carried in the SIB 1 message corresponding to the serving cell for which the UE has camped on in a storage device. The cell-level information may comprise the system information, such as the PCCH configuration information carried in the SIB 2 message, broadcasted by the serving cell. Because the value tag carried in the SIB 1 message may indicate a change in system information, in the embodiment, when the target cell which was used as a serving cell, was previously camped on by the UE, the processor 340 may further comprise a processor logic unit for determining whether a value tag carried in the currently received SIB 1 message equals to a stored value tag stored corresponding to the target cell. When the value tag carried in the currently received SIB 1 message equals to the stored value tag, it means that the stored cell-level information corresponding to the target cell is still valid. Therefore, the processor 340 may further comprise a processor logic unit for obtaining the stored cell-level information (for example, the paging parameters) corresponding to the target cell from the storage device, and use the stored cell-level information to derive the structure (i.e. the occurrence time) of the paging frames (PF) and paging occasions (PO). In other words, after the SIB 1 message (such as the SIB 1 message 501 or 601 shown in FIG. 5 or FIG. 6) has been received and the value tag is determined to have been unchanged, the UE may directly apply the previously stored PCCH configuration corresponding to the target cell to derive the structure of the paging frames and paging occasions before the SIB 2 message (such as the SIB 2 message 502 or 602 shown in FIG. 5 or FIG. 6) has been received. Therefore, the UE may stopping the monitoring of the paging identifier during every possible paging occasion for power saving after the SIB 1 message has been received. Thus, the extended monitoring intervals 520 and 620 may be shorter than the extended monitoring intervals 510 and 610, and may be ended earlier once the SIB 1 message is received.

On the other hand, when the UE has never camped on the target cell as a serving cell before, or when there is no stored cell-level information corresponding to the target cell, or when the value tag carried in the SIB 1 message currently received from the target cell does not equal to a stored value tag corresponding to the target cell, the UE may keep applying the proposed monitoring method and monitor the paging identifier during every possible paging occasion until the SIB 2 message has been received. In this case, because the new PCCH configuration corresponding to the target cell may be obtained from the currently received SIB 2 message, the UE may stop the monitoring of the paging identifier during every possible paging occasion thereafter. Therefore, the extended monitoring intervals 510 and 610 shown in FIG. 5 and FIG. 6 may be ended as the SIB 2 message is received.

Figure 7:
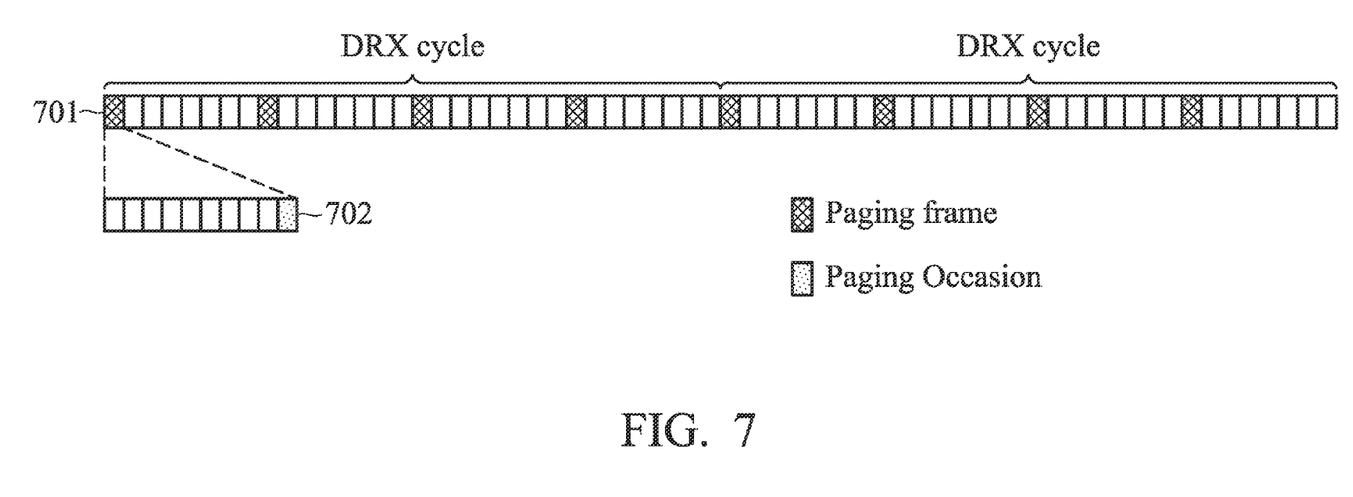
FIG. 7 is a radio frame structure showing the occurrence time of the derived paging occasions according to an embodiment of the invention.

No matter whether the paging parameters are obtained from the previously stored cell-level information corresponding to the target cell when it was still valid, or from the currently received MIB and SIB messages, the UE may derive the structure (i.e. the occurrence time) of the paging frames and paging occasions based on the SFN and the PCCH configuration, and may start monitoring the P-RNTI on the PDCCH only during the derived paging frames and paging occasions that belong to the UE, such as the paging frame 701 and paging occasion 702 shown in FIG. 7. For saving more power, the UE may only monitor the P-RNTI on the PDCCH in one paging occasion per DRX (Discontinuous Reception) cycle indicated by the target cell. Note that in the embodiments, once the SIB 2 message has been received, the target cell becomes a serving cell.

Besides the cell-level information, in some embodiments of the invention, the UE may further store network-level information corresponding to a carrier frequency of a PLMN that the UE has used or is associated with, and use the network-level information to monitor the P-RNTI on the PDCCH during every possible paging occasion before the MIB message has been received from the target cell. As previously described, some basic system information, such as the downlink system bandwidth information and antenna number, is carried in the MIB message. Therefore, in the conventional design, before receiving the MIB message from the target cell, the UE cannot monitor the paging channel due to lack of the basic system information.

However, based on the invention concept, because the network-level information corresponding to a carrier frequency of a PLMN that the UE has used or is associated with has been stored or recorded by the UE, when the target cell belongs to the same PLMN and uses the same carrier frequency, the stored network-level information may be applied again before the MIB message has been received from the target cell. Therefore, in the embodiments of the invention, a further performance enhancement is achieved by applying the stored network-level information before the MIB message has been received from the target cell to facilitate the UE to monitor the paging channel in advance. When the stored network-level information is valid, the paging message may be correctly decoded by the UE.

Figure 8:
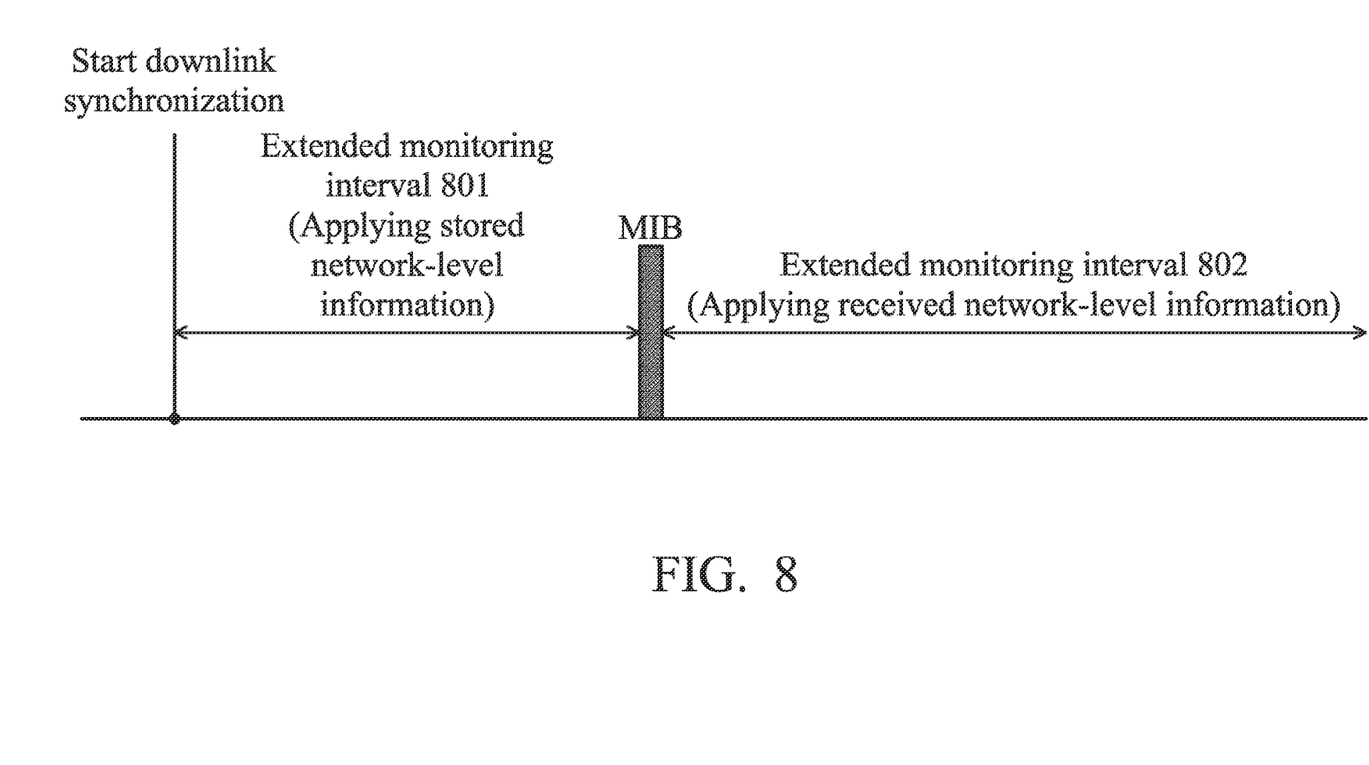
FIG. 8 is a schematic diagram showing the concept of applying the stored network-level information before the MIB message has been received according to an embodiment of the invention.

FIG. 8 is a schematic diagram showing the concept of applying the stored network-level information before the MIB message has been received according to an embodiment of the invention. As shown in FIG. 8, during a portion of the extended monitoring interval (labeled by extended monitoring interval 801) after the downlink synchronization has begun and before the MIB message is received, the stored network-level information may be applied for the UE to monitor the P-RNTI on the PDCCH during every possible paging occasion. During another portion of the extended monitoring interval (labeled by extended monitoring interval 802) after the MIB message has been received, the received network-level information, which is obtained from the currently received MIB message, may be applied for the UE to monitor the P-RNTI on the PDCCH during every possible paging occasion. Note that this concept is applicable in both the cell selection and cell reselection procedures.

Based on the invention concept, one benefit of advancing the beginning time of the extended monitoring interval to the time when the downlink synchronization has begun may be gained. In addition, another benefit of simultaneously monitoring the paging channels of the original serving cell and the target cell (when applied in the cell reselection procedure) without intentionally switching back and forth between the paging channels of different cells may further be gained. This is because in the embodiment of the invention, all of the possible paging occasions can be monitored by the UE during the extended monitoring interval. When the original serving cell and the target cell belong to the same tracking area, the paging message transmitted by the original serving cell and the target cell may both be detected and received by the UE during the extended monitoring interval. Therefore, in the embodiments of the invention, when the UE still wants to receive paging messages from the original serving cell, the UE does not need to switch back to the paging channel corresponding to the original serving cell. Thus, no paging message would be lost.

Figure 9:
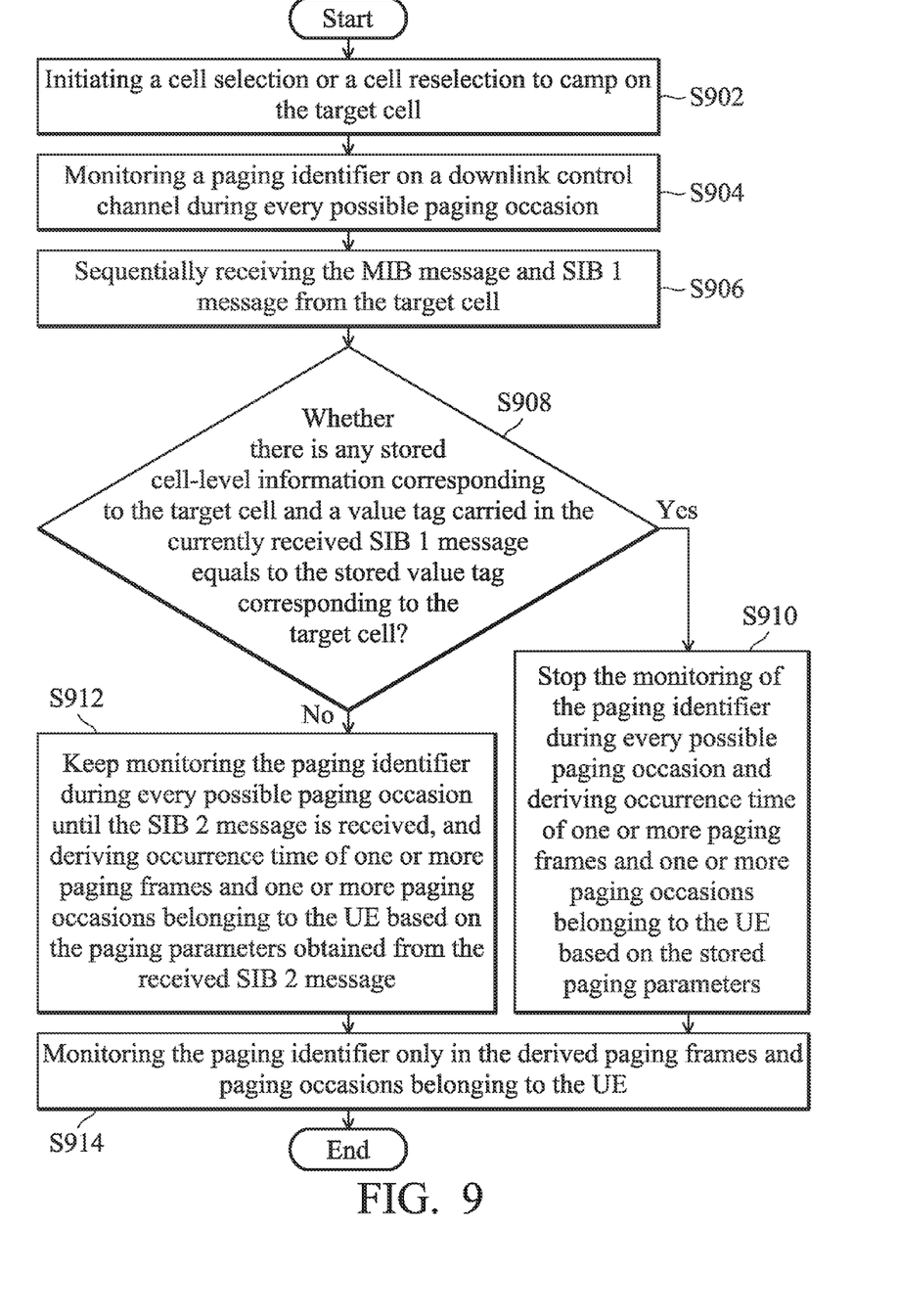
FIG. 9 is a flow chart of a method for monitoring a paging message without paging lost according to an embodiment of the invention.

FIG. 9 is a flow chart of a method for monitoring a paging message without paging lost according to an embodiment of the invention. In this embodiment, it is assumed that a target cell to be camped on in a cell selection or a cell reselection procedure has been determined and the network-level information corresponding to the same carrier frequency of a PLMN that the target cell belongs to has been stored or recorded by the UE. In this embodiment, after initiating a cell selection or a cell reselection to camp on the target cell (Step S902), the UE may begin monitoring a paging identifier on a downlink control channel during every possible paging occasion (Step S904), so as to check whether there is any forthcoming paging message before the paging parameters are obtained from the target cell. While monitoring the paging identifier, the UE may sequentially receive the MIB message and SIB 1 message from the target cell (Step S906). Upon receiving the SIB 1 message, the UE may determine whether there is any stored cell-level information corresponding to the target cell and a value tag carried in the currently received SIB 1 message equals to the stored value tag corresponding to the target cell (Step S908). If there is any stored cell-level information corresponding to the target cell and a value tag carried in the currently received SIB 1 message equals to the stored value tag corresponding to the target cell, the UE may stop the monitoring of the paging identifier during every possible paging occasion and derive an occurrence time of one or more paging frames and one or more paging occasions belonging to the UE based on the stored paging parameters (Step S910). If there is no stored cell-level information corresponding to the target cell or a value tag carried in the currently received SIB 1 message does not equal to the stored value tag corresponding to the target cell, the UE may keep monitoring the paging identifier during every possible paging occasion until the SIB 2 message is received, and derive an occurrence time of one or more paging frames and one or more paging occasions belonging to the UE based on the paging parameters obtained from the received SIB 2 message (Step S912). When the occurrence time of one or more paging frames and one or more paging occasions corresponding to the UE and the target cell have been derived, the UE may start monitoring the paging identifier only in the derived paging frames and paging occasions belonging to the UE(Step S914).

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus, comprising:
a processor, coupled to a transceiver,
wherein the processor at least comprises:
a first processor logic unit, initiating a cell selection or a cell reselection procedure to camp on a target cell and obtain a plurality of paging parameters carried in one or more system information messages transmitted by the target cell via the transceiver; and
a second processor logic unit, monitoring a paging identifier on a downlink control channel via the transceiver to check whether there is any forthcoming paging message before the paging parameters are obtained from the target cell.

2. The communication apparatus as claimed in claim 1, wherein the second processor logic unit monitors the paging identifier on the downlink control channel in every radio frame.

3. The communication apparatus as claimed in claim 2, further comprising:
a third processor logic unit, receiving a system information block type 1 (SIB 1) message from the target cell via the transceiver; and
a fourth processor logic unit, determining whether a value tag carried in the currently received SIB 1 message equals to a stored value tag stored corresponding to the target cell,
wherein when the value tag carried in the currently received SIB 1 message equals to the stored value tag, the second processor logic unit stops monitoring the paging identifier in every radio frame.

4. The communication apparatus as claimed in claim 3, further comprising:
a fifth processor logic unit, obtaining a plurality of stored paging parameters stored corresponding to the target cell when the value tag carried in the currently received SIB 1 message equals to the stored value tag, and deriving the occurrence time of one or more paging frames and one or more paging occasions based on the stored paging parameters; and
a sixth processor logic unit, monitoring the paging identifier on the downlink control channel via the transceiver to check whether there is any forthcoming paging message at the derived paging frames and paging occasions.

5. The communication apparatus as claimed in claim 2, further comprising:
a seventh processor logic unit, receiving a system information block type 2 (SIB 2) message from the target cell via the transceiver,
wherein the second processor logic unit stops monitoring the paging identifier in every radio frame after the SIB 2 message has been received.

6. The communication apparatus as claimed in claim 1, wherein the second processor logic unit monitors the paging identifier on the downlink control channel during every possible paging occasion, and wherein the possible paging occasions occur in a plurality of predetermined sub-frames of a radio frame that are able to carry a paging message.

7. The communication apparatus as claimed in claim 6, wherein each radio frame comprises 10 sub-frames, and the possible paging occasions occur in the $1^{st}$, $2^{nd}$, $5^{th}$, $6^{th}$, $7^{th}$ and $10^{th}$ sub-frames.

8. The communication apparatus as claimed in claim 1, wherein the system information messages at least comprise a master information block (MIB) message transmitted by the target cell, and the second processor logic unit monitors the paging identifier on the downlink control channel via the transceiver before the MIB message transmitted by the target cell has been received.

9. A method for monitoring a paging message without paging lost, comprising:
initiating a cell selection or a cell reselection procedure to camp on a target cell and obtain a plurality of paging parameters carried in one or more system information messages transmitted by the target cell via a transceiver of a communications apparatus; and
monitoring a paging identifier on a downlink control channel via the transceiver to check whether there is any forthcoming paging message before the paging parameters are obtained from the target cell.

10. The method as claimed in claim 9, wherein the step of monitoring the paging identifier on the downlink control channel is executed for every radio frame.

11. The method as claimed in claim 10, further comprising:
receiving a system information block type 1 (SIB 1) message from the target cell via the transceiver; and
determining whether a value tag carried in the currently received SIB 1 message equals to a stored value tag stored corresponding to the target cell,
wherein when the value tag carried in the currently received SIB 1 message equals to the stored value tag, and the method further comprises:
stopping the monitoring of the paging identifier in every radio frame.

12. The method as claimed in claim 11, further comprising:
obtaining a plurality of stored paging parameters stored corresponding to the target cell when the value tag carried in the currently received SIB 1 message equals to the stored value tag;
deriving the occurrence time of one or more paging frames and one or more paging occasions based on the stored paging parameters; and monitoring the paging identifier on the downlink control channel via the transceiver to check whether there is any forthcoming paging message at the derived paging frames and paging occasions after stopping of the monitoring of the paging identifier in every radio frame.

13. The method as claimed in claim 10, further comprising:
receiving a system information block type 2 (SIB 2) message from the target cell via the transceiver,
stopping the monitoring of the paging identifier in every radio frame after the SIB 2 message has been received.

14. The method as claimed in claim 9, wherein the step of monitoring the paging identifier on the downlink control channel is executed for every possible paging occasion, and wherein the possible paging occasions occur in a plurality of predetermined sub-frames of a radio frame that are able to carry a paging message.

15. The method as claimed in claim 14, wherein each radio frame comprises 10 sub-frames, and the possible paging occasions occur in the $1^{st}$, $2^{nd}$, $5^{th}$, $6^{th}$, $7^{th}$ and $10^{th}$ sub-frames.

16. The method as claimed in claim 9, wherein the system information messages at least comprise a master information block (MIB) message transmitted by the target cell, and the step of monitoring the paging identifier on the downlink control channel is executed before the MIB message transmitted by the target cell has been received.

* * * * *